United States Patent [19]

Freeman et al.

[11] Patent Number: 4,747,960
[45] Date of Patent: May 31, 1988

[54] WATER ABSORBENT PACKET

[76] Inventors: Clarence S. Freeman; Katherine M. Freeman, both of 16242 Katherin La., Channelview, Tex. 77530

[21] Appl. No.: 735,792

[22] Filed: May 17, 1985

[51] Int. Cl.$^4$ ............................................. B01D 15/00
[52] U.S. Cl. ........................................ 210/689; 55/29; 174/14 R
[58] Field of Search .................. 55/29, 30; 174/14 R; 210/689

[56] References Cited

U.S. PATENT DOCUMENTS

| | | | |
|---|---|---|---|
| 1,475,548 | 11/1923 | Hunt . | |
| 2,214,925 | 9/1940 | Guthrie | 252/2 |
| 2,352,158 | 6/1944 | Bishop | 174/14 |
| 2,578,324 | 12/1951 | Southwick | 183/4.8 |
| 3,272,742 | 9/1966 | Polishuk | 252/28 |
| 3,589,364 | 6/1971 | Dean et al. | 128/284 |
| 3,661,815 | 5/1972 | Smith | 260/17.4 |
| 3,880,752 | 4/1975 | Premo | 210/54 |
| 3,990,872 | 11/1976 | Cullen | 55/274 |
| 4,036,360 | 7/1977 | Deffeyes | 206/204 |
| 4,124,116 | 11/1978 | McCabe | 206/204 |
| 4,242,206 | 12/1980 | Estabrooke | 210/489 |
| 4,295,987 | 10/1981 | Parks | 252/194 |
| 4,419,236 | 12/1983 | Hsu | 210/689 |
| 4,437,082 | 3/1984 | Walsh et al. | 336/58 |
| 4,454,055 | 6/1984 | Richman et al. | 252/194 |
| 4,588,505 | 5/1986 | Walley et al. | 210/500.1 |

OTHER PUBLICATIONS

Diagnetics Technical Bulletin Insulgard TB/1G 84–5.
Diagnetics Technical Bulletin Hydrolock TB/HL 84–5.

Primary Examiner—Ivars Cintins
Attorney, Agent, or Firm—Margaret A. Boulware

[57] ABSTRACT

The present invention relates to a water absorbent packet and the method of using the packet in liquids to be kept free of invasive water. The packets are made of sheets of material which allow the water in the liquid to penetrate into the packet and contact the water absorbent material. Any water present in the liquid which contacts the absorbent material is absorbed from the liquid.

The packets can be manufactured to the size desired for use in the system to be kept water free and the desired number of compartments of absorbent material. The amount of absorbent material in the compartments can be measured so that upon water absorption the compartment becomes swollen, giving a visual check for the presence of water. The absorbent compound of this invention can be sodium poly-2-propenoate, carboxymethyl cellulose or other form of the super absorbent composition or polymers which will not migrate through the sheets of material when placed in the liquid and when water is absorbed from the liquid. The packets can be constructed from sheets of polyester cotton fabric bonded so that compartments are formed enclosing the super absorbent material.

3 Claims, 1 Drawing Sheet

WATER ABSORBENT PACKET

BACKGROUND OF THE INVENTION

In the area of usage of super water absorbent compositions, the primary applications have been found in the personal products and water vapor absorption from an environment desired to be kept free of humidity. There are needs to keep certain types of fluids free of water in industrial and fuel dispensing application when water or water vapor invades a liquid.

For instance in the area of under sea seismic oil and gas exploration, the cable containing sensitive electronic equipment is laid in the ocean for days at a time. The cable is joined in 100 meter lengths and is susceptible to sea water invading at the joinder of sections of cable known as the cable connection booted sections or solid body cable connectors or further along the cable if damage occurs. The cables are filled with dielectric oil to protect the equipment. The presence of water causes malfunctioning of geophysical electronic equipment and is a persistent problem in the underwater exploration for oil and gas.

Certain hydrocarbon products are susceptible to the unwanted addition of water which can occur during transportation or storage. Water can become entrapped in barges, train tank cars and barrels diminishing the quality of the hydrocarbon product. In the case of fuels, the presence of water is quite deleterious to engines and very critical for aviation fuel such that special filters have been designed.

Another area of need for water free liquid is in the area of electrical equipment such as transformers which are protected by a tank of dielectric fluid. One method of maintaining the dielectric oil free of water and other contaminants necessitates the installation of a pump and filter system to filter out moisture, particles and the like as shown in U.S. Pat. No. 4,437,082 to Walsh et al. issued on Mar. 13, 1984. Another cartridge filter system is shown in U.S. Pat No. 3,272,742 to Polishuk issued Sept. 13, 1966. The filter systems have the obvious disadvantage of modification of the vessel to accommodate a filter system.

Another approach to absorbing water from a hydrocarbon such as gasoline in a service station storage tank without a filter or cartridge is disclosed in U.S. Pat. No. 3,880,752 to Premo, issued Apr. 29, 1975. The water absorbent polymer is rendered a highly viscous mass capable of absorbing water in the tank, but incapable of being pumped.

Various desiccants have been developed and used for removal of water vapor from ambient air. These packets of desiccants are used in packaging products sensitive to moisture and are shown in Cullen, U.S. Pat. No. 3,990,872 and Deffeyes, U.S. Pat. No. 4,035,360. Desiccant like materials have been packaged in plastic webbing for use in liquids to remove water with a water absorption of 40% by weight in products known as Insulgard and Hydrolock by Diagnetics, Inc. of Tulsa, Oklahoma. This degree of water absorption is magnitudes less than the present invention. The Diagnetics, Inc. products have a water removal quality by squeezing that is not a feature of the present invention which traps the moisture and cannot be squeezed out.

The super water absorbent materials have been developed primarily with the personal products and household emphasis on practical applications. The super absorbent materials have been developed for use in diapers, sanitary napkins, paper towel and wipes. Often these products utilize carboxymethyl cellulose or its derivatives as the water absorbent compound. An example is U.S. Pat. No. 3,589,364 to Dean et al. issued June 29, 1971 which discussed the uses of carboxymethyl cellulose fibers as absorbents for a number of personal products, but also cites a use for a cartridge or cylinder packed with the fibers for absorbing and removing water present in a hydrocarbon fluid by passing the fluid through the cylinder.

Other super water absorbent compounds are disclosed in U.S. Pat. No. 3,661,815 to Smith, issued May 9, 1972, for alkali metal carboxylate salts of starch-polyacrylonitrile graft copolymers with stated utility in the personal and hygiene products area. Another absorbent copolymer which has stated utility for diapers and catamenials is a cross linked sodium polyacrylate disclosed in U.S. Pat. No. 4,295,987 to Parks, issued Oct. 20, 1981.

SUMMARY OF THE INVENTION

The present invention is to utilize a highly water absorbent composition such as a "super" absorbent polymer or copolymer which is packaged in a very adaptable form for usage in liquids which should be kept water free as well as an ambient environment. The packets contain the super absorbent composition totally enclosed in a compartment so that the absorbent composition is confined in the compartment.

The invention provides for an absorbent system such that the absorbent material is confined during usage and does not migrate from the packet.

The packets can be used in vessels of hydrocarbon liquid such as dielectric oils which need to be free of water. The water absorbent material does not absorb the hydrocarbon liquid. The packets are made of sheets of material which are bonded or sewn together. The material can be cut and bonded in any shape necessary for use in the vessel or container of choice and offers a high degree of flexibility of choice of usage.

The invention also provides for a packet and system of protection from unwanted water in a liquid contained in a vsel which cannot be adapted for use with a filtering system or a filtering system would be too expensive for the application, but a water free liquid is still desirable. Due to the super absorbing of the material used, the volume of absorbent material used is less. The size and number of packets used in an application can be easily adapted due to the absorbency of the material and the flexibility of the size and shape of the packet.

In an application where the packet can be viewed, the invention provides a visual check for invasive water because the super absorbent material will swell inside the packet. The swelling from water absorption will be seen indicating to the viewer the presence of water in the liquid.

DESCRIPTION OF THE DRAWINGS

The drawings show one embodiment of the invention for exemplary purposes.

DESCRIPTION

The super absorbent material used in the invention is confined in a compartment of woven or porous material which allows the penetration of fluid through the material. The super absorbent must be retained in the compartments in the pocket and therefore cannot be of a fine consistency which will escape through the material. Similarly, when the absorbent material is contacted with water it will not migrate out of the compartment. This is particularly important when a water free liquid is required around sensitive equipment where particles of foreign material would affect the performance.

The material or fabric must be woven or sufficiently porous to allow passage of the liquid around the water absorbent material. The water absorbent material must be in contact with the liquid to be kept water free. A cotton or cotton and polyester fabric has been found to be suitable for use in dielectric and mineral oils.

The fabric is cut to the desired shape and size for the particular vessel or use needed. The size and shape of the packet will be dictated by the method of introduction and withdrawal from the vessel. The size of the packet and number of compartments is relative to the amount of water absorption necessary. Multi-compartment packets have been found to have increased effectiveness in water absorption.

Figure 1:
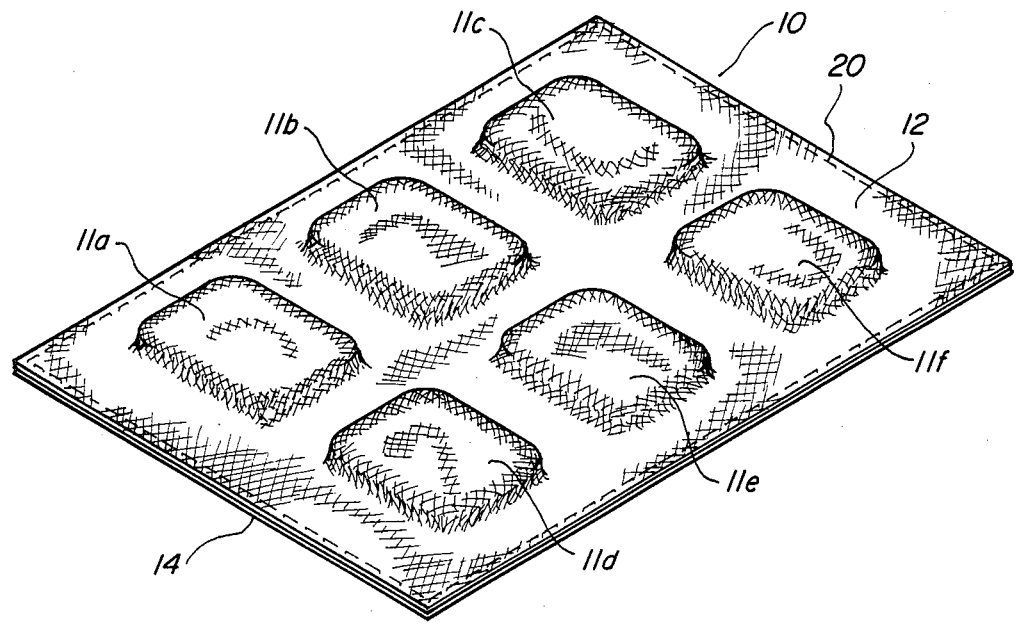
FIG. 1 is the top view of one embodiment of a packet with six compartments of water absorbent material.
Figure 2:
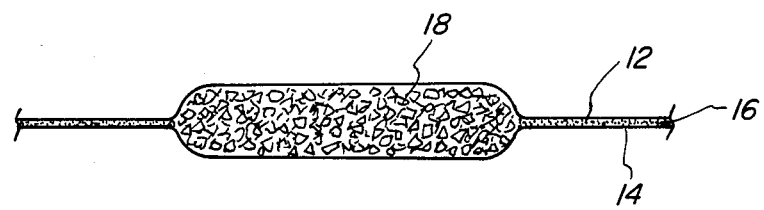
FIG. 2 is a cross-sectional view of one compartment with a heat fusible adhesive.
Figure 3:
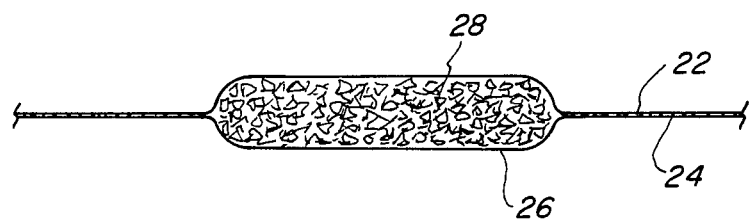
FIG. 3 is a cross-sectional view of one compartment with heat bonding method.

FIG. 1 shows a multi-compartment packet 10 of this invention. The packet is made of an upper and lower sheet of fabric. The upper layer of fabric 12 is bonded to a lower layer of fabric 14. In FIG. 1a multiple compartment embodiment is shown, with six compartments 11a–11f. FIG. 2 shows an embodiment with a bonding material 16 which fuses the two layers of fabric 12 and 14 together. A stitched reinforcing seam 20 may be added on the outer edge of packet 10 for additional strength in addition to the bonding. If desired, stitching can be done around the compartments to provide additional means for segregating the absorbent in the compartments. The super absorbent material is shown as granular material 18. FIG. 2 shows a cross-section of a compartment before the super absorbent material has contacted water. As granular material 18 contacts and absorbs water it expands in volume to show a visible swelling of the pouch. Fabric layers 12 and 14 will stretch to some extent after the granular material has expanded from water absorption to fill the cavity of the compartment. FIG. 3 shows a cross-section of a compartment bonded using the fusion properties of a polyester composition fabric. At approximately 350° F. polyester will heat fuse to itself to form the compartments. In FIG. 3 upper fabric layer 22 and lower fabric layer 24 have been heat fused in a pattern to cause the formation of compartment 26. Granular absorbent 28 is shown in compartment 26.

EXAMPLE 1

The following packet construction was made for use in an underwater geophysical seismic cable filled with dielectric oil. Two pieces of 65% polyester and 35% combed cotton fabric were trimmed to 7" by 7" squares. The fabric squares were bonded together with a heat fusable adhesive to form six compartments of approximately 2½" by 1¼" rectangles. Enclosed in each of the compartments is approximately one-half teaspoon of outer edges of the polyester and cotton fabric squares were stitched together for reinforcement. The packet was placed in a section of seismic cable filled with oil and water. The cable was filled with 32 fluid ounces of dielectric oil and 6 fluid ounces of water. The packet absorbed all of the visible water and the compartments were visibly swollen after service. It was found that the water absorbent sodium poly-2-propenoate would not absorb the oil, but does absorb at least fourteen times its own volume of water. Upon absorption of a significant amount of water the material becomes a jell, but does not migrate out of the compartments. The packets have been observed experimentally and in the field of at least 120 days without migration of the absorbent outside the compartment. The jell cannot be squeezed to release the entrapped moisture. Also, the swelling of the absorbent is quite noticeable visually.

EXAMPLE 2

A six compartment packet with the dimensions 7 inches by 7 inches was constructed using the same method and cotton polyester fabric described in Example 1. The two sheets of fabric were fused with a heat fusible adhesive to form six compartments and reinforcement stitching was made around the edges. The water absorbent material was a carboxymethyl cellulose product manufactured by Buckeye Cellulose Corporation. An essentially pure sheet of carboxymethyl cellulose was cut into approximately ⅛" by ¼" pieces. The pieces were added to a teaspoon measure and placed in each compartment. This packet absorbed the same amount of water when tested under the same conditions as described in Example 1 in a seismic cable filled with dielectric oil.

EXAMPLE 3

A six compartment packet with the same dimensions and the same fabric of Example 1 was constructed. The heat fusible adhesive was not used and the compartments were made by heat fusing the polyester-cotton fabric to itself by applying heat to the fabric sheets at about 350° F. The heat fusion process eliminates the necessity of a separate adhesive for the bonding process. The compartments were filled with the granular absorbent DRYTECH and the packet functions in the same manner described in Example 1.

EXAMPLE 4

Another embodiment of the packet can be made from 100% cotton fabric. Combed and unsized cotton fabric was cut into sheets as described in Example 1. Since the 100% cotton fabric does not have any polyester content, a heat fusible bonding material needs to be used to form the compartments. A packet of the size and shape described in Example 1 was prepared using the Dow "DRYTECH" sodium poly-2-propenoate granular absorbent in the amounts and manner described in Example 1. The packet of combed, unsized cotton performed as previously discussed in Example 1.

As can be seen from the two examples, the super absorbent composition is not intended to be limited to a particular absorbent. The invention is not intended to be limited to use in any type of liquid. The packets can be used in ambient air for the purpose of absorbing unwanted moisture. This application could be used in ground. Although the equipment is in a container unwanted moisture will invade and upset the delicate equipment. By inserting a packet in the container the equipment can be protected from moisture.

For applications in vessels or containers where one would not want the packet free floating an attachment can be made on the packet to suspend it in the vessel. Also, for stationary vessels multiple packet can be positioned in the liquid holding area for effective contact of the absorbent material and the liquid to be kept water free.

What is claimed is:

1. A method for detection and removal of water from dielectric oil in an underwater seismic cable system, cable connector booted section, and solid body cable connectors, or atmospheric mositure from containers of seismic equipment in humid environments comprising inserting at least one packet with an upper and lower sheet of material which allows penetration of fluid and is bonded to form at least ont totally enclosed compartment which contains a water absorbent material contained in said compartment which absorbs water in anotehr liquid and water from the atmosphere, said packet selectively sized to fits within the system part or container in which it is placed and each compartment of absorbent capable of absorbing water, in the system part or container to be protected from water or atmospheric moisture;

placing into service the underwater seismic cable system or the containers of seismic equipment in the humid environment with the packet inserted into the system for water detection and removal;

observing said packet for swelling indicating water absorption; and retaining said packet in said section of seismic cable until said water absorbent material is saturated with water.

2. A method for detection and removal of water from dielectric oil in an underwater seismic cable system, cable connector booted section and solid body cable connectors, or atmospheric moisture from containers of seismic equipment in humid environments of claim 1 wherein said packet material is selected from fabrics of a cottom or cotton-polyester blend and the water absorbent material is a polymer which will not migrate out of the compartment upon water absorption.

3. A method for detection and removal of water from dielectric oil in an underwater seismic cable system, cable connector booted section and solid body cable connectors, or atmospheric moisture from containers of seismic equipment in humid environments of claim 1 wherein said packet is filled with a water absorbent material selected from the group consisting of carboxymethyl cellulose and sodium poly-2-propenoate.

* * * * *